INVENTOR.
R.E. REUSSER

United States Patent Office 3,239,307
Patented Mar. 8, 1966

3,239,307
REMOVAL OF SELENIUM FROM URANIUM
LEACH LIQUORS
Robert E. Reusser, Bartlesville, Okla., assignor to Phillips Petroleum Company, a corporation of Delaware
Filed July 26, 1962, Ser. No. 214,787
8 Claims. (Cl. 23—14.5)

This disclosure is a continuation-in-part of my copending application, Serial No. 860,771, filed December 21, 1959, now abandoned.

This invention relates to a method for removing selenium from leach liquor in the carbonate leaching of uranium ores. In another aspect, it relates to the recovery of elemental selenium from uranium containing materials.

To control soluble selenium compounds build up in the carbonate leaching process, one alternative would be to regularly withdraw a portion of the leaching solution which is being recycled, and pass this stream to a selected waste disposal area. Another more useful alternative is to remove the selenium values in the form of relatively pure elemental selenium which can be purified for many electrical uses.

Many of the ores which are now being treated by the carbonate leach process contain selenium compounds in varying amounts with substantially all of this selenium being dissolved from the ore, during the leaching step along with uranium values. Subsequently, the uranium values are most commonly recovered from the pregnant leach liquor by a precipitation step which comprises raising the pH of the liquor to a level where sodium uranates become insoluble, or reducing agents are employed to reduce the uranium values to an insoluble tetravalent form. After separation of the precipitated uranium compounds, the barren leaching solution, still containing selenates, is recarbonated to lower the carbonate content and form bicarbonates and is recycled to the grinding step for use in preparing additional ore slurry. As the selenium compounds do not precipitate out along with the uranates, there results an undesirable pyramiding of selenium compounds in the leaching circuit, which will simultaneously increase the concentration of soluble selenium compounds being sent to disposal in the tailings pond along with the inert solids.

I have discovered that by converting the selenium compounds to elemental selenium, rather than permitting them to pass to waste disposal in soluble form, a safe and profitable method of resolving the selenium build up problem in the carbonate leaching of uranium ores is achieved. The method of my invention comprises treating the pregnant liquor stream, containing hexavalent uranium values, with an agent which selectively converts the soluble selenate compounds to elemental selenium, which is insoluble in leach liquor and is removed from the system by filtration, then passing the pregnant liquor on to precipitation and recovery of uranium values by conventional means. The result is a substantially, selenium-free, barren solution coming from the uranium recovery steps which is recycled via the recarbonation step for leaching of fresh ore slurry. An important result is the production of a finely-divided, relatively-pure selenium, which may be further purified for use in the growing electrical applications for this element.

Alternatively, the clarified pregnant liquor stream, can be first reduced with a reducing agent, preferably aluminum powder, which will precipitate out the uranium values, as well as reducing the soluble selenates to soluble selenides. The resulting slurry is handled in the same manner as the precipitate formed after selenium removal in the first described process, except that after separation of the precipitated uranium values, the leach solution is treated to convert the still soluble selenide compounds to valuable, elemental selenium, and separating said selenium before being recycled to the leaching circuit.

Accordingly, it is an object of this invention to provide an economical method for the removal of selenium from leach liquor in the carbonate leaching of uranium ores. Another object is to remove selenium from pregnant leach liquor by reducing selenates to insoluble elemental selenium. It is a further object to remove the selenium values in the form of relatively-pure elemental selenium which can be purified for electrical applications. Other objects, as well as aspects and advantages inherent in this method of selenium removal will become apparent upon studying the accompanying disclosure and drawing.

Figure 1:
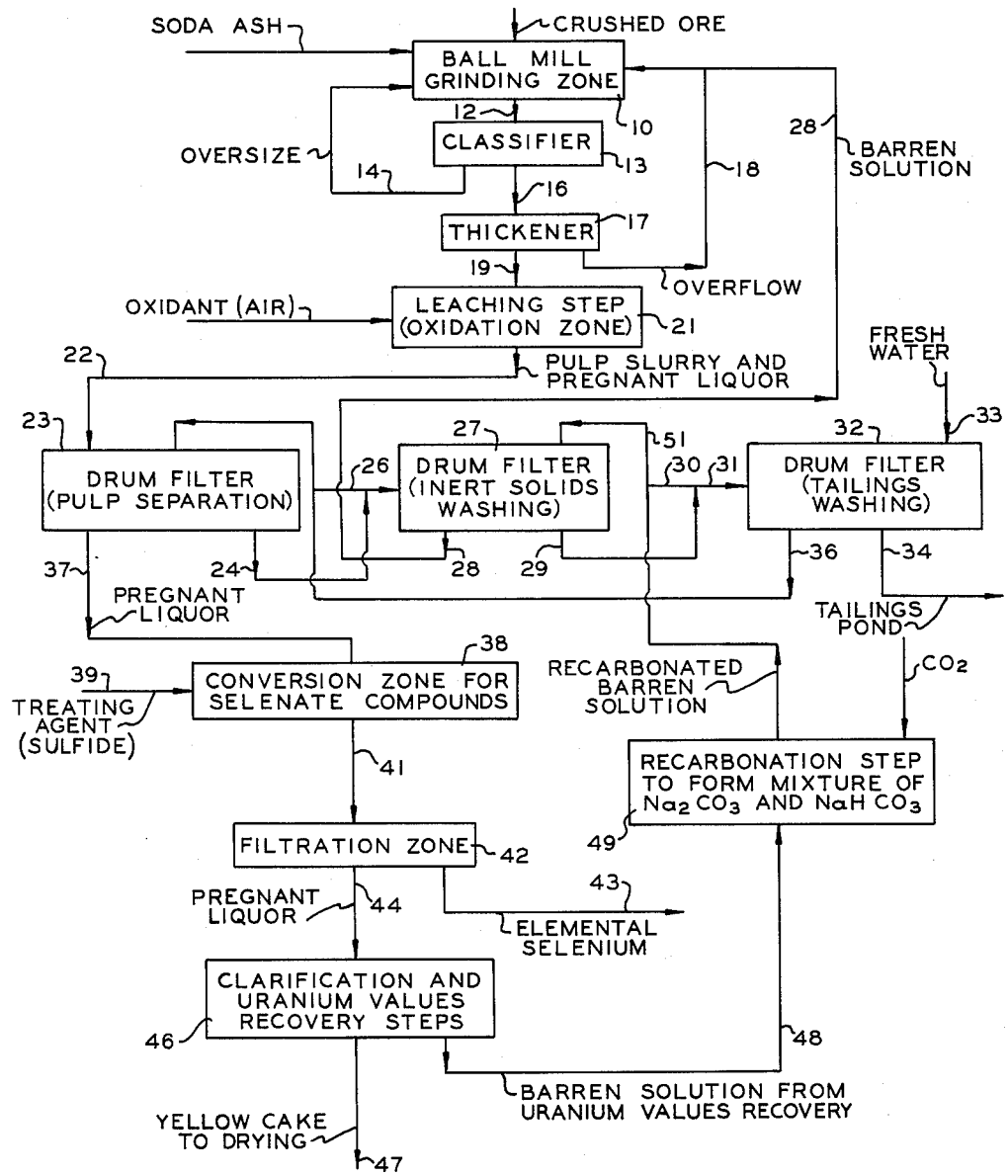
FIGURE 1 is a process diagram depicting the carbonate leach process for the recovery of uranium values from their ores including the step of selenium recovery prior to precipitating the uranium values.

Referring now to the drawing, in which like parts have been designated by like reference numerals, and to FIGURE 1 in particular, and beginning at the top of the diagram; crushed, uranium-bearing ore and soda ash are introduced to the ball mill grinding zone 10 wherein the ore is ground to a fine condition in the presence of water, sodium carbonate (soda ash) and sodium bicarbonate (in the barren solution recycle). An ore slurry leaves the ball mill and passes on through line 12 to classifier 13 wherein oversized particles are returned to ball mill 10 via conduit 14, and the remaining fine ore slurry passes through line 16 to a thickener 17. From the thickener, overflow is returned by a conduit 18 to the grinding step, while the thickened slurry goes through conduit 19 to leaching step 21 wherein the oxidation and dissolution of the uranium and certain other elements of the ore takes place. The slurry is contacted with oxygen by passing air therethrough, and maintained at a predetermined temperature for a period of time so as to cause the uranium values to go into solution as the sodium uranyl tricarbonate complex, forming what is termed in the art, a pregnant liquor.

The pregnant liquor and pulp slurry leave oxidation zone 21 through conduit 22 and enter vacuum drum filter 23, wherein the pulp and the pregnant liquor are separated. The pulp, principally composed of inert solids, passes through conduits 24, and 26 to a second vacuum drum filter 27, wherein the inert solids are washed with part of a recycled, recarbonated barren solution. The filtrate from this filter passes through conduit 28 back to the ball mill grinding zone 10. The solids (tailings) from filter 27 passing through conduit 29 are combined with the balance of recarbonated barren solution from conduit 30 before passing through conduit 31 into a third drum filter 32. The tailings are washed in zone 32, but now with fresh water introduced through conduit 33 and finally passed through conduit 34 to a tailings pond for disposal. The filtrate from filter 32 is passed through conduit 36, part being used as feed to the spray of filters 23, and the remainder being used to slurry the pulp in conduit 24.

The pregnant liquor filtrate from filter 23 passes through conduit 37 to a conversion zone 38, wherein the soluble selenate compounds are converted to insoluble selenium by the introduction of a treating agent through line 39.

This is indicated by the solution in zone 38 turning black, and spontaneously, a greenish-black precipitate forms, indicating the formation of elemental selenium, and probably elemental sulfur.

A slurry of these compounds in the pregnant liquor then passes through conduit 41 to a filtration zone 42, wherein elemental selenium is separated and passed through conduit 43 for further purification and use. The filtrate from filtration zone 42, now a substantially elemental selenium-free pregnant liquor, moves on through line 44 to a series 46 of steps including clarification, precipitation or other recovery means, thickening and washing, of the yellow cake product, and finally to drying via conduit 47. The barren solution in conduit 48 passes through a zone 49 where it is recarbonated with flue gas, or the like, before passing to the drum filtration zone, specifically filters 27 and 32. This recycle stream is divided, with approximately half being fed through conduit 51 to filter 27, and the remainder being introduced through conduits 30 and 31 to filter 32, after combining with the tailings in conduit 29. This recarbonated barren solution after passing through the drum filters, finally reaches conduit 28 through which it passes back to ball mill grinding zone 10.

Figure 2:
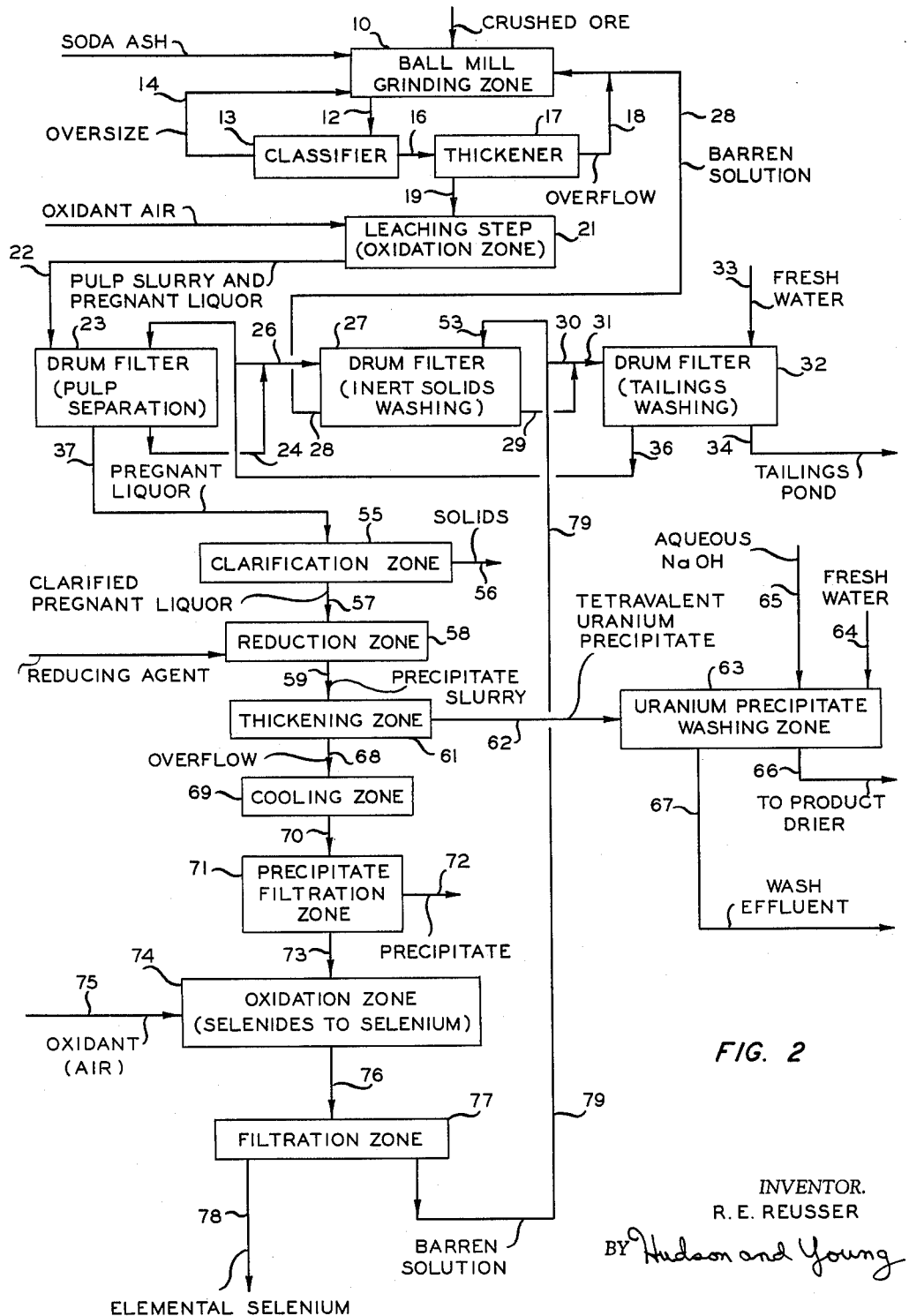
FIGURE 2 is a process diagram depicting another embodiment of the same process wherein selenium is recovered subsequent to the precipitation of the uranium values.

In FIGURE 2, crushed, uranium-bearing ore and soda ash are introduced to the ball mill grinding zone 10, wherein the ore is ground to a fine condition in the presence of water, sodium carbonate (soda ash) and sodium bicarbonate. An ore slurry leaves the ball mill and passes on through conduit 12 to classifier 13 wherein oversize particles are turned to the ball mill 10 via conduit 14, and the remaining fine ore slurry passes through conduit 16 to a thickener 17. From the thickener, overflow is returned via conduit 18 to the grinding step, while the thickened slurry goes from conduit 19 to leaching step 21, wherein the oxidation and dissolution of uranium ore takes place. The slurry is contacted with oxygen, by passing air therethrough, and maintained at a predetermined temperature for a period of time to cause uranium values to go into solution as the sodium uranyl tricarbonate complex, forming what is termed in the art, a pregnant liquor. The pulp slurry and pregnant liquor leave oxidation zone 21 through conduit 22 and enter drum filter 23, wherein the pulp is separated from the pregnant liquor. The pulp, principally composed of inert solids, passes through conduits 24 and 26 to a second drum filter 27, wherein the inert solids are washed with part of a recycled, recarbonated barren solution. The filtrate from filter 27 passes through conduit 28 back to ball mill grinding zone 10. The inert solids (tailings) pass from filter 27 through conduit 29, are combined with the balance of recarbonate barren solution from a conduit 30 before passing through conduit 31 into a third filter 32. In filter 32 the tailings are washed with fresh water introduced through conduit 33, before being passed through conduit 34 to a tailings pond for disposal. The filtrate from filter 32 passes through conduit 36 part being used as feed to the sprays of filter 23, the remainder being used to slurry the pulp in conduit 26.

The pregnant liquor filtrate from filter 23 passes through conduit 37 to a clarification step 55, wherein any finely divided solids present are removed via conduit 56. The clarified pregnant liquor from zone 55 passes through conduit 57 to reduction zone 58, wherein a reducing agent, such as aluminum, effects the reduction of both selenate compounds to soluble selenide compounds and the soluble hexavalent uranium compounds to insoluble tetravalent uranium compounds. The precipitated slurry from reduction zone 58 passes through conduit 59 to a thickening zone 61, wherein the tetravalent uranium compound precipitate is drawn off as the underflow through conduit 62 to precipitate washing zone 63. The precipitate is normally washed with fresh water introduced through conduit 64, and is then passed through conduit 66 to the product dryer. Alternatively, if undesired cooling takes place in zone 58, such that a minor amount of aluminum hydroxide precipitates upstream of, or in thickening zone 61, thus contaminating the product passing to zone 63, the product can be washed with aqueous sodium hydroxide therein, 10% by weight NaOH for example, which is introduced via conduit 65. In either case, wash effluent is removed from zone 63 via conduit 67. The overflow from thickening zone 61 passes through conduit 68 to cooling zone 69, e.g., an indirect heat exchanger, wherein the temperature of the solution is lowered to a temperature below 50° C., thus causing the precipitation of aluminum hydroxide. The resulting slurry then passes through conduit 70 to precipitate filtration zone 71, wherein the precipitate is filtered out and removed via conduit 72. The filtrate passes via conduit 73 to oxidation zone 74, wherein an oxidant, such as air, is introduced through conduit 75 to oxidize soluble selenide compounds to insoluble selenium. The slurry from zone 74 passes through conduit 76 to a filtration zone 77, wherein elemental selenium is separated and passes through conduit 78 to final purification and use. The filtrate from filtration zone 77 passes through conduit 79 back to the drum filtration zone, specifically filters 27 and 32.

According to the present invention, a treating agent is added to the pregnant leach solution to convert the selenates to other selenium compounds. It is necessary to employ an excess of treating agent, and this agent should be present in an amount ranging from 0.1 to 4.0 mols of agent per mol of selenium present in the solution. It is preferred to use from 0.25 to 2.0 mols per mol on the same basis. Some examples of suitable treating agents which can be employed are sodium sulfide, hydrogen sulfide, sodium thiosulfate, sodium sulfite, sodium hydrosulfite, and metallic aluminum. Other alkali metal sulfides, thiosulfates, sulfites and hydrosulfites can be employed, but these materials are not as economical as the sodium compounds. A choice of the particular treating agent will depend upon the desired route for uranium recovery. If sodium sulfide or hydrogen sulfite is employed, the selenates are converted to insoluble selenium compounds without causing reduction of the hexavalent uranium values to the tetravalent state. If aluminum is chosen both the selenates and the hexavalent uranium values are reduced, in which case the tetravalent uranium values precipitate out, while the soluble selenides are formed.

As stated above, the amount of treating agent employed will be at least 0.1 mol per mol of selenium present. The solutions which are tested for recovery of selenium and uranium are neutral to basic solutions, and preferably have a pH of from 7.0 to 10.5, and more preferably between 9 and 10. This conversion step can be carried out at any temperature between 20° C. and 100° C. Temperatures above 100° C. can be employed, but are usually not desirable, since pressure vessels are required to avoid the evaporation of the solution. It is preferred to carry out the conversion above 75° C., and in the case of reduction with aluminum, temperatures above 80° C. are required. The reduction of hexavalent uranium values with aluminum at temperatures above 80° C. is the subject matter of a copending application of James L. Hart, Serial Number 10,849, filed February 25, 1960, now abandoned. The length of time required for the reduction step will vary considerably but will usually be between 5 minutes and 10 hours.

As described above, in connection with the embodiment of FIGURE 2, the second conversion step will be carried out subsequent to the uranium precipitation and separation. The second conversion step is carried out at a temperature between 20 and 100° C. preferably at a temperature above 70° C. Any suitable agent can be employed but it is most convenient to use air as the agent.

The amount of oxygen theoretically required is ½ mol per mol of selenium present, although it is necessary to introduce a very large excess of air to insure complete conversion. It is preferred to use from 10 to 1000 mols of oxygen per mol of selenium, said oxygen being supplied by bubbling air through the solution at a rate sufficient to supply this volume of the oxidizing agent. Generally, the second conversion step will require from 2 to 40 hours, although longer times can be used if desired. At these retention times, air rates of from 2 to 20 liters per hour per liter of solution are quite satisfactory.

Following the second conversion step, the elemental selenium can be recovered by any suitable means as filtration. The precipitated elemental selenium is very finely divided, and is very difficult to filter. It is advantageous to employ a filter aid in carrying out this filtration. Suitable filter aids include, for example, charcoal and diatomaceous earth. While the present invention has as its principal object of the removal of selenium from carbonate leach liquors to avoid the accompanying problems, the selenium which precipitates is of a high purity and can be further purified for use in current outlets for this element. At the present time, selenium is widely used in photoelectric cells and in diodes.

The following specific examples are intended to illustrate the present invention, but it is not intended that the invention be limited to the particular embodiments shown therein.

EXAMPLE I

A run was carried out in which a pregnant carbonate leach liquor was contacted with sodium sulfide, under nitrogen cover. In this run, 900 milliliters of a pregnant length liquor (pH approximately 9.5), which contained 0.565 gram per liter of selenium in the form of selenates, was charged to a vessel under $N_2$ cover. 2.25 milliliters of sodium sulfide solution, containing 0.108 grams of $Na_2S$ per mol, was charged to the mixture at room temperature, and, the solution turning black, and subsequently a greenish black precipitate formed. The precipitate was recovered by centifuging, was washed with water, dried over aceton, dried under $N_2$ at 105° C. for 30 minutes. An X-ray diffraction analysis of this sample showed only selenium to be present. No iron, vanadium or uranium was detected.

EXAMPLE II

A series of runs were carried out in which elemental selenium was precipitated from clarified pregnant uranium leach liquor from a carbonate mill by means of sodium sulfide.

In each of these runs, an amount of the clarified pregnant uranium solution was treated with an amount of aqueous sodium sulfide solution, after which the resulting elemental selenium which precipitated was filtered off. The filtrate was then analyzed for selenium content, and the amount of selenium recovered as precipitate was calculated.

The clarified pregnant uranium solution analyzed as follows:

*Clarified pregnant solution analysis*

| | |
|---|---|
| $U_3O_8$ | g./l. 3.64 |
| $V_2O_5$ | g./l. 0.57 |
| Se | g./l. 0.64 |
| Mo | g./l. 1.80 |
| $Na_2CO_3$ | g./l. 34.3 |
| $NaHCO_3$ | g./l. 14.9 |
| $Na_2SO_4$ | g./l. 81.0 |
| Cl | g./l. 0.4 |
| pH | 9.75 |
| Specific gravity | 1.141 |

The sodium sulfide solution was prepared by dissolving 30.0 grams $Na_2S \cdot 5H_2O$ in distilled water and diluting to a final volume of 100 ml. This solution analyzed 108 grams/liter $Na_2S$.

The results of six runs wherein the amount of $Na_2S$ used was varied are expressed below as Table I.

TABLE I

| Ml. of Pregnant Solution | Ml of $Na_2S$ Solution | Mole Ratio, $Na_2S$/Se | Filtrate Analysis, g./l. Se | Percent Se Recovered |
|---|---|---|---|---|
| 110 | 0.20 | 0.31/1.0 | 0.549 | 14.48 |
| 110 | 0.40 | 0.685/1.0 | 0.492 | 24.45 |
| 110 | 0.60 | 0.792/1.0 | 0.489 | 23.38 |
| 110 | 1.00 | 1.54/1.0 | 0.469 | 26.97 |
| 110 | 2.00 | 3.1/1.0 | 0.486 | 24.30 |
| 110 | 3.00 | 4.64/1.0 | 0.642 | [1] None |

[1] The precipitated selenium apparently redissolved when this amount of $Na_2S$ was used.

The result of seven runs wherein the pH of the pregnant solution was varied by adding either small amounts of acid or base prior to $Na_2S$ addition are expressed below as Table II.

TABLE II

| Ml. of Pregnant Solution | Ml. of $Na_2S$ Solution | Mole Ratio, $Na_2S$/Se | pH of Pregnant Solution | G/l. Se in Filtrate | Percent Se Recovered |
|---|---|---|---|---|---|
| 100 | 0.40 | 0.685 | 11.1 | 0.627 | 2 |
| 100 | 0.40 | 0.685 | 10.0 | 0.518 | 19 |
| 100 | 0.40 | 0.685 | 9.5 | 0.498 | 22.1 |
| 100 | 0.40 | 0.685 | 9.0 | 0.506 | 20.9 |
| 100 | 0.40 | 0.685 | 8.5 | 0.506 | 20.9 |
| 100 | 0.40 | 0.685 | 8.0 | 0.505 | 21.1 |
| 100 | 0.40 | 0.685 | 7.0 | 0.501 | 21.7 |

As will be evident to those skilled in the art, the various modifications of this invention can be made or followed in the light of the foregoing disclosure and discussion without departing from the spirit and scope of the claims.

Having disclosed my invention, I claim:

1. A process for recovering uranium and selenium values from an ore which comprises oxidizing an aqueous slurry of comminuted uranium and selenium-containing ore in the presence of a carbonate leaching solution in a leaching zone to form a pregnant liquor containing dissolved water soluble uranium compound and dissolved water soluble selenium compounds; separating undissolved solids; treating said pregnant liquor with aluminum to form insoluble uranium values and soluble selenium values; recovering from said pregnant liquor said insoluble uranium values; oxidizing said pregnant liquor to produce selenium in elemental form; recovering said selenium in elemental form; and recycling the resulting barren solution from the values recovery steps to the leaching circuit.

2. The process of claim 1 in which the carbonate leaching solution is a mixture of sodium carbonate and sodium bicarbonate.

3. In a process for recovering uranium and selenium values from an ore which comprises oxidizing an aqueous slurry of comminuted uranium-containing ore in the presence of a leaching solution in a leaching vessel, forming a pregnant liquor containing a dissolved water soluble hexavalent uranyl compound and water-soluble selenate compounds, recovering uranium values from said pregnant liquor, and recycling the barren solution from the recovery steps to the leaching circuit, the improvement which comprises treating water soluble selenate compounds with an agent selected from the group consisting of sodium sulfide hydrogen sulfide, sodium thiosulfate, sodium sulfite and sodium hydrosulfites to form insoluble elemental selenium, separating said selenium from the resulting slurry in a filtration zone, whereby valuable elemental selenium is recovered, said elemental selenium being recovered before the recovery of said uranium values.

4. In a process for recovering uranium and selenium values from an ore which comprises oxidizing an aqueous slurry of comminuted uranium-containing ore in the presence of sodium carbonate and sodium bicarbonate in a leaching vessel, forming a pregnant liquor containing a dissolved water soluble hexavalent uranyl compound and water-soluble selenate compounds, recovering uranium values from said pregnant liquor, and recycling the barren solution from the recovery steps to the leaching circuit, the improvement which comprises concomitantly reducing water soluble selenate compounds to soluble selenide compounds and soluble hexavalent uranium values to an insoluble tetravalent uranium compound with a reducing agent consisting of powdered aluminum, oxidizing said soluble selenide compounds with an oxidant to insoluble elemental selenium, and separating said selenium from the resulting slurry in a filtration zone, whereby valuable elemental selenium is recovered.

5. The process according to claim 4 in which said insoluble tetravalent uranium compound is uranium dioxide.

6. In a process for recovering uranium and selenium values from an ore which comprises oxidizing an aqueous slurry of comminuted uranium-containing ore in the presence of sodium carbonate and sodium bicarbonate in a leaching vessel, forming a pregnant liquor containing a dissolved water soluble hexavalent uranyl compound and water-soluble selenate compounds, recovering uranium values from said pregnant liquor, and recycling the barren solution from the recovery steps to the leaching circuit, the improvement which comprises concomitantly reducing water soluble selenate compounds to soluble selenide compounds and soluble hexavalent uranium values to insoluble tetravalent uranium compounds with powdered aluminum, removing the insoluble uranium compounds in a thickening zone, passing the overflow from said thickening zone to a cooling zone wherein an aluminum hydroxide precipitates, passing the slurry from said cooling zone to a precipitate filtration zone wherein said precipitate is filtered out and removed, passing said liquor to an oxidation zone, oxidizing said soluble selenide compounds with an oxidant to insoluble elemental selenium, and separating said selenium from the resulting slurry in a filtration zone, whereby elemental selenium is recovered.

7. In a process for recovering uranium and selenium values from an ore which comprises oxidizing an aqueous slurry of comminuted uranium-containing ore in the presence of a leaching solution in a leaching vessel, forming a pregnant liquor containing a dissolved water soluble hexavalent uranyl compound and water-soluble selenate compounds, recovering uranium values from said pregnant liquor, and recycling the barren solution from the recovery steps to the leaching circuit, the improvement which comprises treating soluble selenate compounds with an agent comprising sodium sulfide, to form insoluble elemental selenium compound, and separating said selenium from the resulting slurry in a filtration zone, whereby valuable elemental selenium is recovered, said elemental selenium being recovered before the recovery of said uranium values.

8. In a process for recovering uranium and selenium values from an ore which comprises oxidizing an aqueous slurry of comminuted uranium-containing ore in the presence of a leaching solution in a leaching vessel, forming a pregnant liquor containing a dissolved water soluble hexavalent uranyl compound and water-soluble selenate compounds, recovering uranium values from said pregnant liquor, and recycling the barren solution from the recovery steps to the leaching circuit, the improvement which comprises treating soluble selenate compounds with an agent comprising sodium sulfide, to form insoluble elemental selenium compound, said agent being added in an amount ranging from 0.1 to 4.0 mols thereof per mol of selenium present in the solution; and separating said selenium from the resulting slurry in a filtration zone, whereby valuable elemental selenium is recovered, said elemental selenium being recovered before the recovery of said uranium values.

References Cited by the Examiner

UNITED STATES PATENTS

| | | | |
|---|---|---|---|
| 1,915,703 | 5/1932 | Towne et al. | 23—209 X |
| 2,900,229 | 8/1959 | McClaine | 23—14.5 |
| 2,949,339 | 8/1960 | Marvin | 23—14.5 |
| 3,086,841 | 8/1963 | Hunt et al. | 23—14.5 |

OTHER REFERENCES

Clagg et al., Uranium Ore Processing, Addison-Wesley Publishing Co., Inc., Reading, Mass., 1958, pp. 162–166.

REUBEN EPSTEIN, *Primary Examiner.*

CARL D. QUARFORTH, *Examiner.*

R. L. GOLDBERG, J. D. VOIGHT, B. R. PADGETT,
*Assistant Examiners.*